(12) United States Patent
Liang et al.

(10) Patent No.: US 12,388,571 B2
(45) Date of Patent: Aug. 12, 2025

(54) SIMULTANEOUS CONNECTIVITY BASED HANDOVER

(71) Applicant: NEC CORPORATION, Tokyo (JP)

(72) Inventors: Lin Liang, Beijing (CN); Gang Wang, Beijing (CN)

(73) Assignee: NEC CORPORATION, Tokyo (JP)

(*) Notice: Subject to any disclaimer, the term of this patent is extended or adjusted under 35 U.S.C. 154(b) by 340 days.

(21) Appl. No.: 17/633,026

(22) PCT Filed: Aug. 7, 2019

(86) PCT No.: PCT/CN2019/099676
§ 371 (c)(1),
(2) Date: Feb. 4, 2022

(87) PCT Pub. No.: WO2021/022527
PCT Pub. Date: Feb. 11, 2021

(65) Prior Publication Data
US 2022/0272598 A1 Aug. 25, 2022

(51) Int. Cl.
*H04L 1/1607* (2023.01)
*H04L 5/00* (2006.01)
(Continued)

(52) U.S. Cl.
CPC .......... *H04L 1/1642* (2013.01); *H04L 5/0053* (2013.01); *H04W 36/00692* (2023.05); *H04W 36/087* (2023.05); *H04W 36/324* (2023.05)

(58) Field of Classification Search
CPC ...... H04W 36/32; H04W 36/08; H04L 1/1642
See application file for complete search history.

(56) References Cited

U.S. PATENT DOCUMENTS

| 2015/0341837 A1* | 11/2015 | Zhao | H04W 48/18 |
| | | | 455/436 |
| 2016/0249259 A1 | 8/2016 | Park et al. | |
| 2020/0068581 A1* | 2/2020 | Xu | H04L 49/552 |

FOREIGN PATENT DOCUMENTS

| CN | 103428796 A | 12/2013 |
| CN | 108282292 A | 7/2018 |

(Continued)

OTHER PUBLICATIONS

Office Action issued Aug. 8, 2023, in Japanese Application No. 2022-507687.
(Continued)

*Primary Examiner* — Michael A Keller
(74) *Attorney, Agent, or Firm* — Sughrue Mion, PLLC

(57) ABSTRACT

Embodiments of the present disclosure relate to methods, devices and computer readable media for data transmission during simultaneous connectivity based handover. A method of communication comprises in response to a second connection being established between a second network device and a terminal device having a first connection with a first network device, determining, at the first network device, a first set of SDUs to be transmitted by the second network device to the terminal device; determining first information regarding a SN assigned to each of the first set of SDUs and a HFN associated with the SN; and transmitting the first set of SDUs and the first information to the second network device. The method further comprises receiving, at the second network device, the first set of SDUs and first information; and transmitting the first set of SDUs to the terminal device based on the first information. The method further comprises receiving, at the terminal device, a first set of PDUs corresponding to the first set of SDUs from the second network device; receiving a second set of PDUs corresponding to the second set of SDUs from the first (Continued)

network device; determining the first information; and determining an order of the first and second sets of PDUs based on the first information. Embodiments of the present disclosure can facilitate correct data transmission during a simultaneous connectivity based handover and improve data transmission efficiency.

4 Claims, 10 Drawing Sheets

(51) Int. Cl.
*H04W 36/00* (2009.01)
*H04W 36/08* (2009.01)
*H04W 36/32* (2009.01)

(56) References Cited

FOREIGN PATENT DOCUMENTS

| CN | 108347727 A | * | 7/2018 | ............ H04W 12/02 |
| CN | 109803331 A | | 5/2019 | |
| EP | 3 576 445 A1 | | 12/2019 | |
| JP | 2012-239153 A | | 12/2012 | |
| WO | WO-2011133934 A1 | * | 10/2011 | ........... H04L 63/068 |
| WO | 2018/137468 A1 | | 8/2018 | |
| WO | 2018/141241 A1 | | 8/2018 | |
| WO | WO-2019141371 A1 | * | 7/2019 | |

OTHER PUBLICATIONS

International Search Report for PCT/CN2019/099676 dated Apr. 29, 2020.
Written Opinion for PCT/CN2019/099676 dated Apr. 29, 2020.
Japanese Office Action dated Feb. 28, 2023 in Japanese Application No. 2022-507687.
Ericsson, "Enhancements to Make-Before-Break for dual active protocol stacks" 3GPP TSG-RAN WG2#106, 2019, R2-1907310, Reno, Nevada, USA, May 13-17, (6 pages total).
Extended European Search Report dated Jul. 12, 2022 in European Application No. 19940565.5.
Ericsson, "Data forwarding at reduced handover interruption", 3GPP TSG-RAN WG2#106, Tdoc R2-1907309, Revision of R2-1903895, 2019 (6 pages total).
Qualcomm Incorporated, "Lossless Make-Before-Break (MBB) HO support for RLC-UM", 3GPP TSG-RAN WG3 Meeting #104, R3-192597, 2019 (3 pages total).
Samsung, "Data forwarding for "Maintaining source eNB connection solution"", 3GPP TSG-RAN WG3 Meeting #93bis, R3-162134, 2016 (4 pages total).
Mediatek Inc., "Data Forwarding to Minimize User Data Interruption during HO", 3GPP TSG RAN WG2 Meeting #106, R2-1905893, Revision of R2-1903248, 2019 (6 pages total).

* cited by examiner

SIMULTANEOUS CONNECTIVITY BASED HANDOVER

CROSS REFERENCE TO RELATED APPLICATIONS

This application is a National Stage of International Application No. PCT/CN2019/099676 filed Aug. 7, 2019.

TECHNICAL FIELD

Embodiments of the present disclosure generally relate to the field of telecommunication, and in particular, to methods, devices and computer storage media for data transmission during simultaneous connectivity based handover.

BACKGROUND

Simultaneous connectivity based handover is being considered in both the third generation partnership project (3GPP) Release-16 long term evolution (LTE) and new radio (NR) mobility enhancement so as to reduce data interruption during the handover. The main idea of the simultaneous connectivity based handover is to keep simultaneous connection of a terminal device with source and target network devices during the handover. In this event, there is an increasing concern on how to perform sequence number (SN) assignment for service data units (SDUs) and how to perform transmission of the SDUs during the handover.

SUMMARY

In general, embodiments of the present disclosure provide methods, devices and computer storage media for data transmission during simultaneous connectivity based handover.

In a first aspect, there is provided a method of communication. The method comprises: in response to a second connection being established between a second network device and a terminal device having a first connection with a first network device, determining, at the first network device, a first set of SDUs to be transmitted by the second network device to the terminal device; determining first information regarding a SN assigned to each of the first set of SDUs and a hyper frame number (HFN) associated with the SN; and transmitting the first set of SDUs and the first information to the second network device.

In a second aspect, there is provided a method of communication. The method comprises: in response to a second connection being established between a second network device and a terminal device having a first connection with a first network device, receiving, at the second network device and from a first network device, a first set of SDUs, and first information regarding a SN assigned to each of the first set of SDUs and a HFN associated with the SN; and transmitting the first set of SDUs to the terminal device based on the first information.

In a third aspect, there is provided a method of communication. The method comprises: in response to a second connection being established between a second network device and a terminal device having a first connection with a first network device, receiving, at the terminal device, a first set of PDUs from the second network device; receiving a second set of PDUs from the first network device; determining first information regarding a SN of each PDU in the first and second sets and a HFN associated with the SN; and determining an order of the first and second sets of PDUs based on the first information.

In a fourth aspect, there is provided a first network device. The first network device comprises a processor and a memory coupled to the processor. The memory stores instructions that when executed by the processor, cause the network device to perform the method according to the first aspect of the present disclosure.

In a fifth aspect, there is provided a second network device. The second network device comprises a processor and a memory coupled to the processor. The memory stores instructions that when executed by the processor, cause the transmitting device to perform the method according to the second aspect of the present disclosure.

In a sixth aspect, there is provided a terminal device. The terminal device comprises a processor and a memory coupled to the processor. The memory stores instructions that when executed by the processor, cause the transmitting device to perform the method according to the third aspect of the present disclosure.

In a seventh aspect, there is provided a computer readable medium having instructions stored thereon. The instructions, when executed on at least one processor, cause the at least one processor to perform the method according to the first aspect of the present disclosure.

In an eighth aspect, there is provided a computer readable medium having instructions stored thereon. The instructions, when executed on at least one processor, cause the at least one processor to perform the method according to the second aspect of the present disclosure.

In a ninth aspect, there is provided a computer readable medium having instructions stored thereon. The instructions, when executed on at least one processor, cause the at least one processor to perform the method according to the third aspect of the present disclosure.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
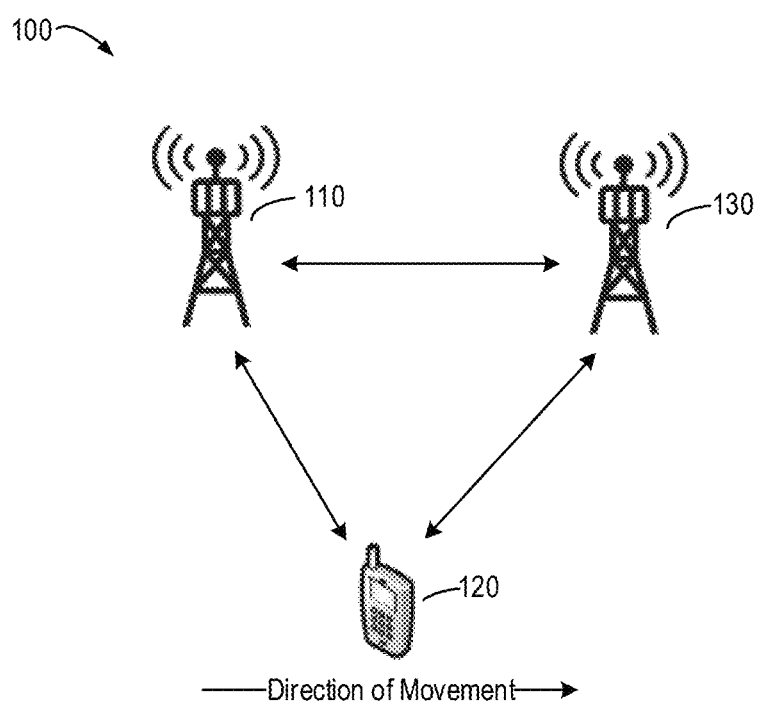
FIG. 1 illustrates an example communication network in which some embodiments of the present disclosure can be implemented.

Principle of the present disclosure will now be described with reference to some embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, tablets, wearable devices, internet of things (IoT) devices, Internet of Everything (IoE) devices, machine type communication (MTC) devices, device on vehicle for V2X communication where X means pedestrian, vehicle, or infrastructure/network, or image capture devices such as digital cameras, gaming devices, music storage and playback appliances, or Internet appliances enabling wireless or wired Internet access and browsing and the like. The term "terminal device" can be used interchangeably with a UE, a mobile station, a subscriber station, a mobile terminal, a user terminal or a wireless device. In addition, the term "network device" refers to a device which is capable of providing or hosting a cell or coverage where terminal devices can communicate. Examples of a network device include, but not limited to, a Node B (NodeB or NB), an Evolved NodeB (eNodeB or eNB), a next generation NodeB (gNB), a Transmission Reception Point (TRP), a Remote Radio Unit (RRU), a radio head (RH), a remote radio head (RRH), a low power node such as a femto node, a pico node, and the like.

In one embodiment, the terminal device may be connected with a first network device and a second network device. One of the first network device and the second network device may be a master node and the other one may be a secondary node. The first network device and the second network device may use different radio access technologies (RATs). In one embodiment, the first network device may be a first RAT device and the second network device may be a second RAT device. In one embodiment, the first RAT device is eNB and the second RAT device is gNB. Information related with different RATs may be transmitted to the terminal device from at least one of the first network device and the second network device. In one embodiment, a first information may be transmitted to the terminal device from the first network device and a second information may be transmitted to the terminal device from the second network device directly or via the first network device. In one embodiment, information related with configuration for the terminal device configured by the second network device may be transmitted from the second network device via the first network device. Information related with reconfiguration for the terminal device configured by the second network device may be transmitted to the terminal device from the second network device directly or via the first network device.

As used herein, the singular forms 'a', 'an' and 'the' are intended to include the plural forms as well, unless the context clearly indicates otherwise. The term 'includes' and its variants are to be read as open terms that mean 'includes, but is not limited to.' The term 'based on' is to be read as 'at least in part based on.' The term 'one embodiment' and 'an embodiment' are to be read as 'at least one embodiment.' The term 'another embodiment' is to be read as 'at least one other embodiment.' The terms 'first,' 'second,' and the like may refer to different or same objects. Other definitions, explicit and implicit, may be included below.

In some examples, values, procedures, or apparatus are referred to as 'best,' 'lowest,' 'highest,' 'minimum,' 'maximum,' or the like. It will be appreciated that such descriptions are intended to indicate that a selection among many used functional alternatives can be made, and such selections need not be better, smaller, higher, or otherwise preferable to other selections.

According to some agreements on a solution for the simultaneous connectivity based handover, a SN assignment for downlink is done at a source network device, the procedure at a terminal device when detaching from the source network device is explicitly defined, a separate security key is used for each of two active protocol stacks, and so on.

In some existing solutions, it has been proposed that the source network device transmits SN status information to the target network device when the source network device is released. In some other existing solutions, it has been proposed that a SN for a radio link control (RLC) unacknowledged mode (UM) should be consecutive during the simultaneous connectivity based handover. However, it is still unclear how to transfer the SN status information from the source network device to the target network device during an activation of the simultaneous connectivity and how to ensure SN continuity upon a release of the source network device for a RLC acknowledged mode (AM) and a RLC UM.

In view of this, embodiments of the present disclosure provide a solution for data transmission during a simultaneous connectivity based handover, so as to solve the above problems and one or more of other potential problems. The solution can achieve and enhance data transmission during simultaneous connectivity based handover. Principles and implementations of the present disclosure will be described in detail below with reference to the figures.

FIG. 1 illustrates a schematic diagram of an example communication network 100 in which embodiments of the present disclosure can be implemented. As shown in FIG. 1, the communication network 100 may include a first network device 110 and a terminal device 120 served by the first network device 110. The communication network 100 may further include a second network device 130, and the terminal device 120 may be handed over from the first network device 110 to the second network device 130. It is to be understood that the number of devices in FIG. 1 is given for the purpose of illustration without suggesting any limitations to the present disclosure. The communication network 100 may include any suitable number of network devices and/or terminal devices adapted for implementing implementations of the present disclosure.

As shown in FIG. 1, the first network device 110 may communicate with the terminal device 120 via a channel such as a wireless communication channel. Similarly, the second network device 130 may also communicate with the terminal device 120 via a channel such as a wireless communication channel. The first and second network devices 110 and 130 may communicate with each other.

For example, in an earlier stage, the terminal device 120 is served by the first network device 110 and a first connection is maintained between the terminal device 120 and the first network device 110. During the terminal device 120 is moving toward the second network device 130 in a direction of movement as shown in FIG. 1, a simultaneous connectivity based handover may be triggered. When the handover is triggered, the terminal device 120 may establish a second connection with the second network device 130 while maintaining the first connection with the first network device 110.

During a simultaneous connectivity based handover, the terminal device 120 may keep the first and second connections with the first and second network devices 110 and 130 simultaneously. In this time, two active protocol stacks are maintained between the terminal device 120 and the first and second network devices 110 and 130.

In the following, some embodiments will be described with reference to the first network device 110 as an example of a source network device and with reference to the second network device 130 as an example of a target network device. For example, the first network device 110 may also be referred to as the "source network device 110", and the second network device 130 may also be referred to as the "target network device 130". It is to be understood that this is merely for the purpose of discussion, without suggesting any limitations to the scope of the present disclosure.

The communications in the communication network 100 may conform to any suitable standards including, but not limited to, Global System for Mobile Communications (GSM), Long Term Evolution (LTE), LTE-Evolution, LTE-Advanced (LTE-A), Wideband Code Division Multiple Access (WCDMA), Code Division Multiple Access (CDMA), GSM EDGE Radio Access Network (GERAN), Machine Type Communication (MTC) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

Figure 2:
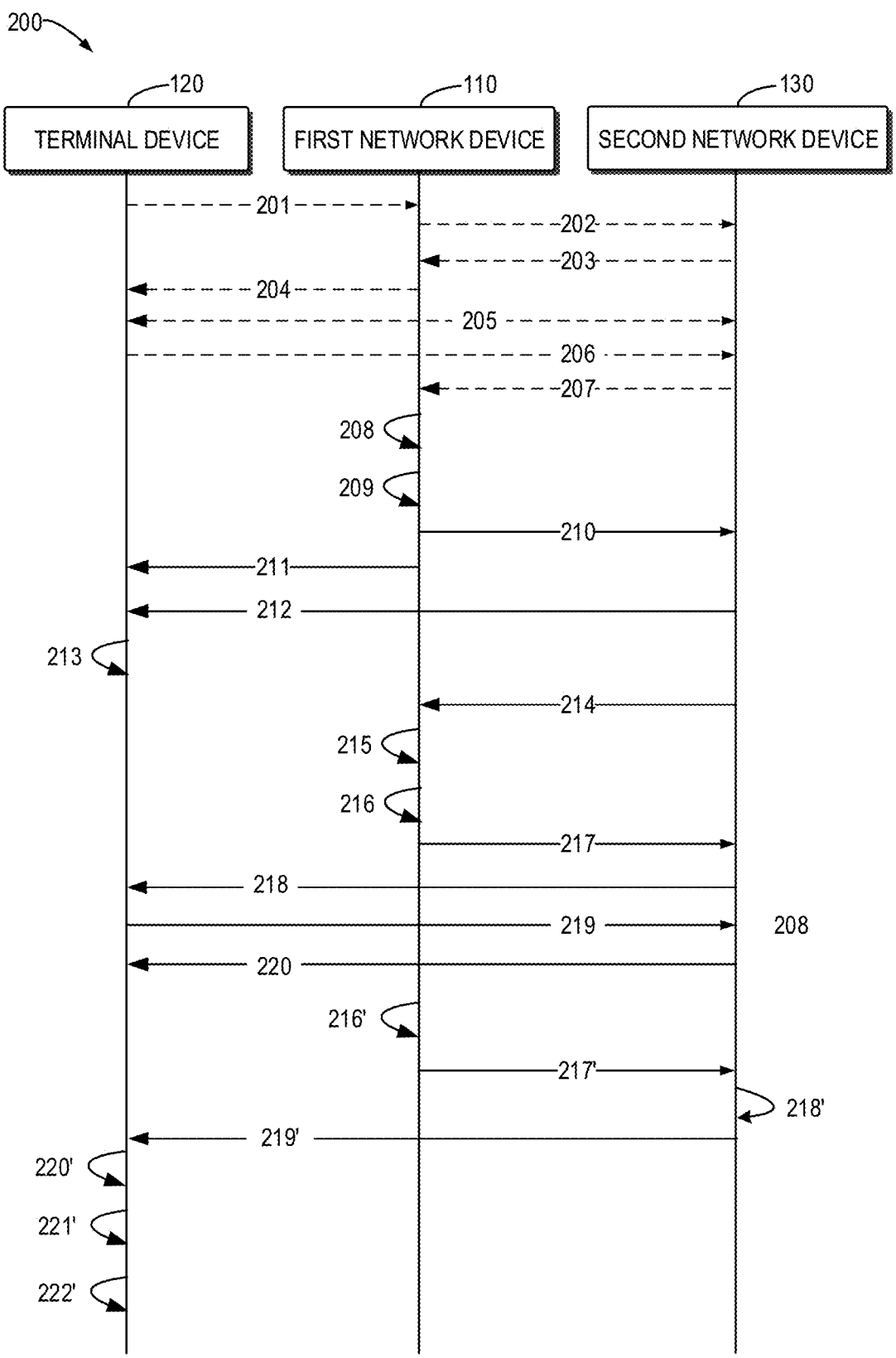
FIG. 2 illustrates a schematic diagram illustrating a process for data transmission during a simultaneous connectivity based handover according to embodiments of the present disclosure.

FIG. 2 shows a schematic diagram illustrating a process 200 for data transmission during a simultaneous connectivity based handover according to embodiments of the present disclosure. For the purpose of discussion, the process 200 will be described with reference to FIG. 1. The process 200 may involve the terminal device 120 and the first and second network devices 110 and 130 as illustrated in FIG. 1.

As shown in FIG. 2, the terminal device 120 may transmit 201 a measurement report to the first network device 110, the measurement report showing that the second network device 130 is more suitable for serving the terminal device 120. In this point, the measurement report can be implemented in any suitable way, and the present application does not make limitation for this. Upon receiving the measurement report, the first network device 120 may transmit 202 a handover request to the second network device 130. In response to receiving the handover request, the second network device 130 may transmit 203 an acknowledgement for handover.

Upon receiving the acknowledgement for handover, the first network device 110 may transmit 204 a handover command to the terminal device 120. In response to receiving the handover command, the terminal device 120 may perform 205 a random access channel (RACH) procedure with the second network device 130 so as to establish a connection (i.e., the second connection) with the second network device 130, and upon completing the RACH procedure, transmit 206 a handover complete message to the second network device 130. So far, simultaneous connections between terminal device 120 and the first and second network devices 110 and 130 are established.

In this event, the second network device 130 may transmit 207 a handover success message to the first network device 110 so as to inform the establishment of the second connection to the first network device 110. In response to the second connection being established while the first connection is maintained, the first network device 110 may determine 208, from a set of SDUs received from a core network (not shown in FIG. 2), a first set of SDUs that are to be transmitted by the second network device 130 to the terminal device 120. In some embodiments, the first network device 110 may determine, from the set of SDUs, a second set of SDUs to be transmitted to the terminal device 120 by itself (not shown in FIG. 2).

In some embodiments, the SDUs may be SDUs in a packet data convergence protocol (PDCP). It should be note that, the SDUs may be SDUs in any other protocol formats existing in the art or to be developed in the future.

In case of keeping the simultaneous connectivity, the first network device 110 will perform a SN assignment for both the first set of SDUs and the second set of SDUs. In some embodiments, the first network device 110 may determine 209 first information regarding a SN assigned to each SDU in the first set and a hyper frame number (HFN) associated with the SN, and transmit 210 the first information along with the first set of SDUs to the second network device 130.

In some embodiments, the first information may be transmitted in a user plane, for example, in a header of a data packet. For example, the first information may be transmitted in a field of a GPRS tunneling protocol for user plane (GTP-U) header. In some alternative or additional embodiments, the first information may be transmitted in a control plane, for example, via a message. For example, the first information may be transmitted in a message conforming to a general packet radio service (GPRS) tunneling protocol for control plane (GTP-C). It should be note that, all the transmission of information (for example, the first and second information mentioned herein) between the first network devices 110 and 130 can be selected as needed to be carried out in the control plane or in the user plane, and the present application is not limited in this point.

As to SN information in the first information, in some embodiments, the first network device 110 may determine respective SNs assigned to SDUs in the first set, and transmit them to the second network device 130. In some embodiments, the SNs may be discrete. In some alternative embodiments, the SNs may be consecutive. In some embodiments in which the SNs are consecutive, the first network device 110 may determine a first SN assigned to the first SDU in the first set, determine the number of subsequent SDUs in the first set, and transmit the first SN and the number of subsequent SDUs to the second network device 130. In this case, transmission capacity will be saved.

As to HFN information in the first information, in some embodiments, the first network device 110 may determine respective HFNs associated with the SNs assigned to SDUs in the first set and transmit the respective HFNs to the second network device 130. In some alternative embodiments, the first network device 110 may determine a first HFN associated with the first SN, and only transmit the first HFN for the first SDU. If a second HFN associated with a SN assigned to one of the subsequent SDUs is different from the first HFN, the first network device 130 may also transmit the second HFN for the one SDU in addition to the first HFN for the first SDU. In this way, transmission capacity will also be saved.

Then the first network device 110 may transmit 211 the second set of SDUs to the terminal device 110. In some embodiments, for each SDU in the second set, the first network device 110 may pack the SDU into a PDU based on a corresponding SN assigned to the SDU, and transmit the PDU to the terminal device 110. In a similar way, the second network device 130 may transmit 212 the first set of SDUs to the terminal device 110.

Upon receiving respective PDUs corresponding to the first and second sets of SDUs, the terminal device 120 may determine 213, from the PDUs, first information regarding a SN of each PDU in the first and second sets and a HFN associated with the SN, so as to determine an order of PDUs in the first and second sets and thus obtain desired service data.

A release of the first network device 120 may be triggered at a proper opportunity. It should be note that, the present application does not make limitation for the triggering opportunity. That is, the release of the first network device 120 may be triggered in any suitable way existing in the art or to be developed in the future.

If a release of the first connection between the first network device 110 and the terminal device 120 is triggered, in some embodiments, the second network device 130 may transmit 214 an indication for releasing the first connection to the first network device 110. In response to receiving the indication, the first network device 110 may release the first connection with the terminal device 120. In some alternative embodiments, the first network device 110 may initiatively release the first connection with the terminal device 120.

In response to the first connection being released and the first connection being in a RLC AM, the first network device 110 may determine 215 second information indicating a SN and a HFN associated with the SN that are to be assigned by the second network device 130 for the next SDU having no SN assigned and determine 216 a third set of SDUs comprising at least one of: i) SDUs with respective SNs that have been transmitted by the first network device 110 but have not been acknowledged by the terminal device 120; and ii) SDUs (for example, new data) without respective SNs that have been received by the first network device 110. Then the first network device 110 may transmit 217 the second information and the third set of SDUs to the second network device 130. In some embodiments, the first network device 110 may transmit, to the second network device 130, further information regarding the SNs associated with the SDUs with respective SNs, for example, in a "PDU number" field of a GTP-U header.

Alternatively or additionally, if the release of the first connection between the first network device 110 and the terminal device 120 is triggered, the second network device 130 may transmit 218 an indication for releasing the first connection to the terminal device 120. In response to receiving the indication, the terminal device 120 may release the first connection with the first network device 110. In some alternative embodiments, the terminal device 120 may initiatively release the first connection with the first network device 110.

In response to the first connection being released and the first connection being in a RLC AM, the terminal device 120 may transmit 219, to the second network device 130, third information (also referred to as data status report below) regarding a fifth set of PDUs which have not been successfully received by the terminal device 120. In some embodiments, the terminal device 120 may transmit the third information in a higher priority than uplink (UL) data transmission. In this way, third information can be ensured to be transmitted to the second network device 130 as earlier as possible, and correct data transmission can be facilitated.

Upon receiving the second information, the further information (if any) and the third set of SDUs from the first network device 110 and receiving the third information from the terminal device 120, the second network device 130 may transmit 220, to the terminal device 120, the fifth set of SDUs which have not been successfully received by the terminal device 120. In addition, the second network device 130 may further receive new SDUs from the core network, and transmit the new SDUs to the terminal device 120 upon assigning corresponding SNs to the new SDUs.

In response to the first connection being released and the first connection being in a RLC UM, the first network device 110 may determine 216' a fourth set of SDUs comprising i) SDUs with respective SNs that have not been transmitted by the first network device 110; and ii) SDUs without respective SNs that have been received by the first network device 110. In some embodiments, the first network device 110 may transmit, to the second network device 130, further information regarding the SNs associated with the SDUs with respective SNs, for example, in a "PDU number" field of a GTP-U header. In some embodiments, the first network device 110 may transmit second information indicating a SN and a HFN associated with the SN that are to be assigned by the second network device 130 for the next SDU having no SN assigned.

Upon receiving the fourth set of SDUs, the second network device 130 may determine 218' second information regarding a SN and a HFN associated with the SN that are to be assigned for the next SDU having no SN assigned. In some embodiments, the second network device 130 may initialize the SN and HFN to be predetermined values. For example, the predetermined values may be zero. It should be note that, the predetermined values may be any suitable integer above zero and may be set as needed.

In some embodiments, the second network device 130 may receive the second information from the first network device 110. In this way, continuous SN assignment may be achieved. In some embodiments, the second network device 130 may receive further information regarding the SNs associated with the SDUs with respective SNs that have not been transmitted by the first network device 110, for example, in a "PDU number" field of a GTP-U header.

In some alternative embodiments, the second network device 130 may determine the SN and HFN as being larger than a SN and HFN for the last SDU transmitted by the second network device 120. In some alternative embodiments, the second network device 130 may determine the SN and HFN as being different from SNs and HFNs for the first set of SDUs transmitted by the second network device 120. In some alternative embodiments, the second network device 130 may determine the SN and HFN as being different from SNs and HFNs that have been assigned by the first network device. In some alternative embodiments, the second network device 130 may initialize the SN and HFN to be predetermined values and determine the SN and HFN as being different from SNs and HFNs for the first set of SDUs transmitted by the second network device 120. It should be note that, the determination of the SN and HFN is not limited to the above-listed example, and may be implemented as needed by the combination of any of the above manners or by other suitable manners.

Then the second network device 130 may transmit 219' the fourth set of SDUs to the terminal device 120 based on the determined second information and the further information (if any). In some embodiments, the second network device 130 may determine a SN which is assigned to the first SDU in the fourth set, and transmit the determined SN to the terminal device 120. In this way, the SN of the first PDU which is assigned by the target network device 130 can be indicated to the terminal device 120, and reordering latency due to missing of PDU on the source network device 110 before being released may be further reduced.

Figure 3:
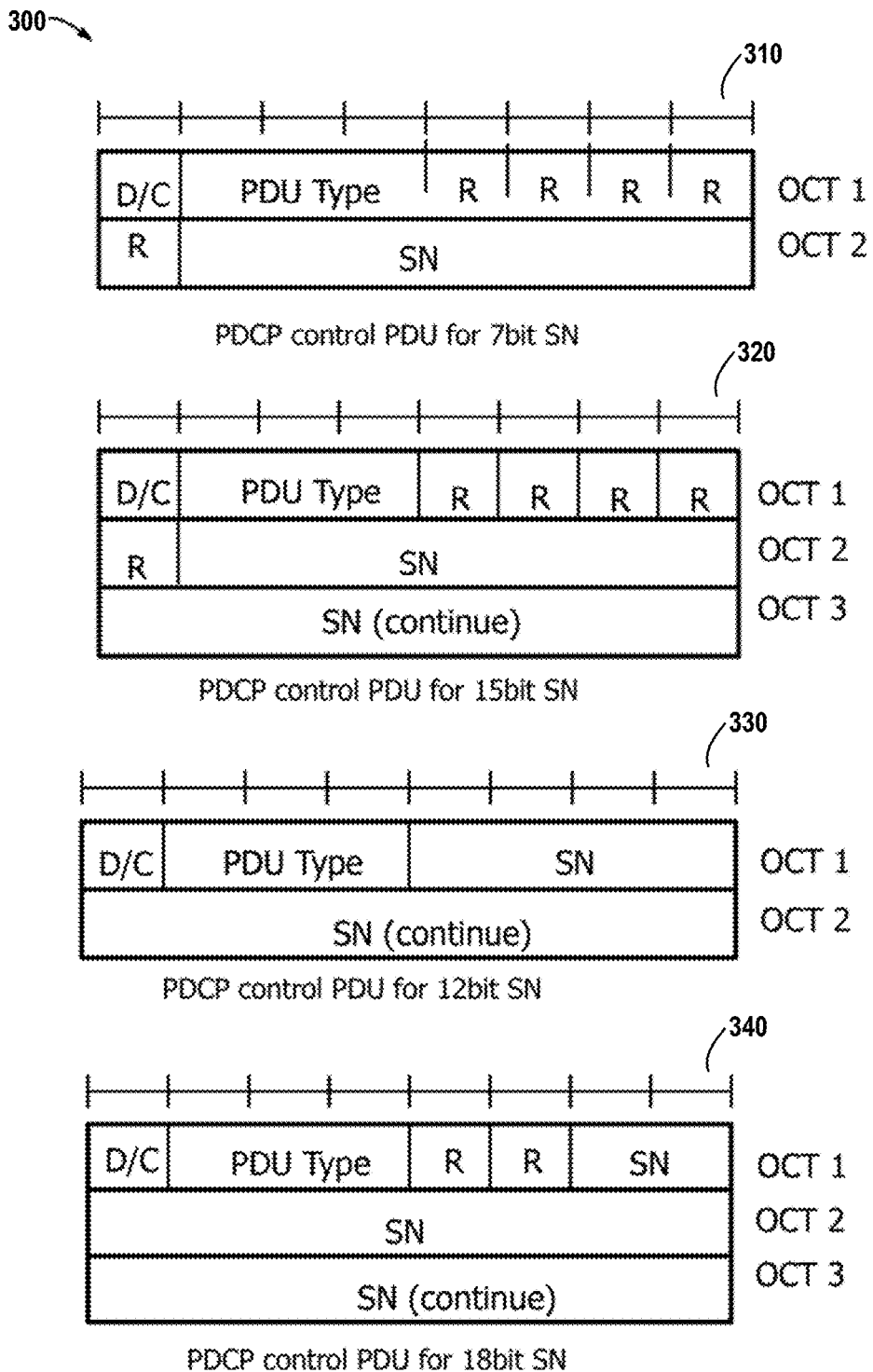
FIG. 3 illustrates some example formats of control PDUs in accordance with embodiments of the present disclosure.

In some alternative embodiments, the second network device 130 may transmit the determined SN in a control PDU. For example, in some embodiments, the control PDU may be implemented using an existing PDU, for example, a control PDU for LTE-WLAN aggregation (LWA) end-marker packet. In some alternative embodiments, the control PDU may be implement by defining a new control PDU, for example, with PDU Type=101 for LTE, and with PDU Type=010 for NR. FIG. 3 illustrates some example formats 300 of control PDUs in accordance with embodiments of the present disclosure. The control PDUs 310-340 respectively show PDCP control PDUs for 7, 12, 15 and 18 bit SNs. D/C field indicates whether the current PDU is a data PDU or a control PDU. R field refers to a reserved field. SN field indicates the content of the determined SN.

Figure 4:
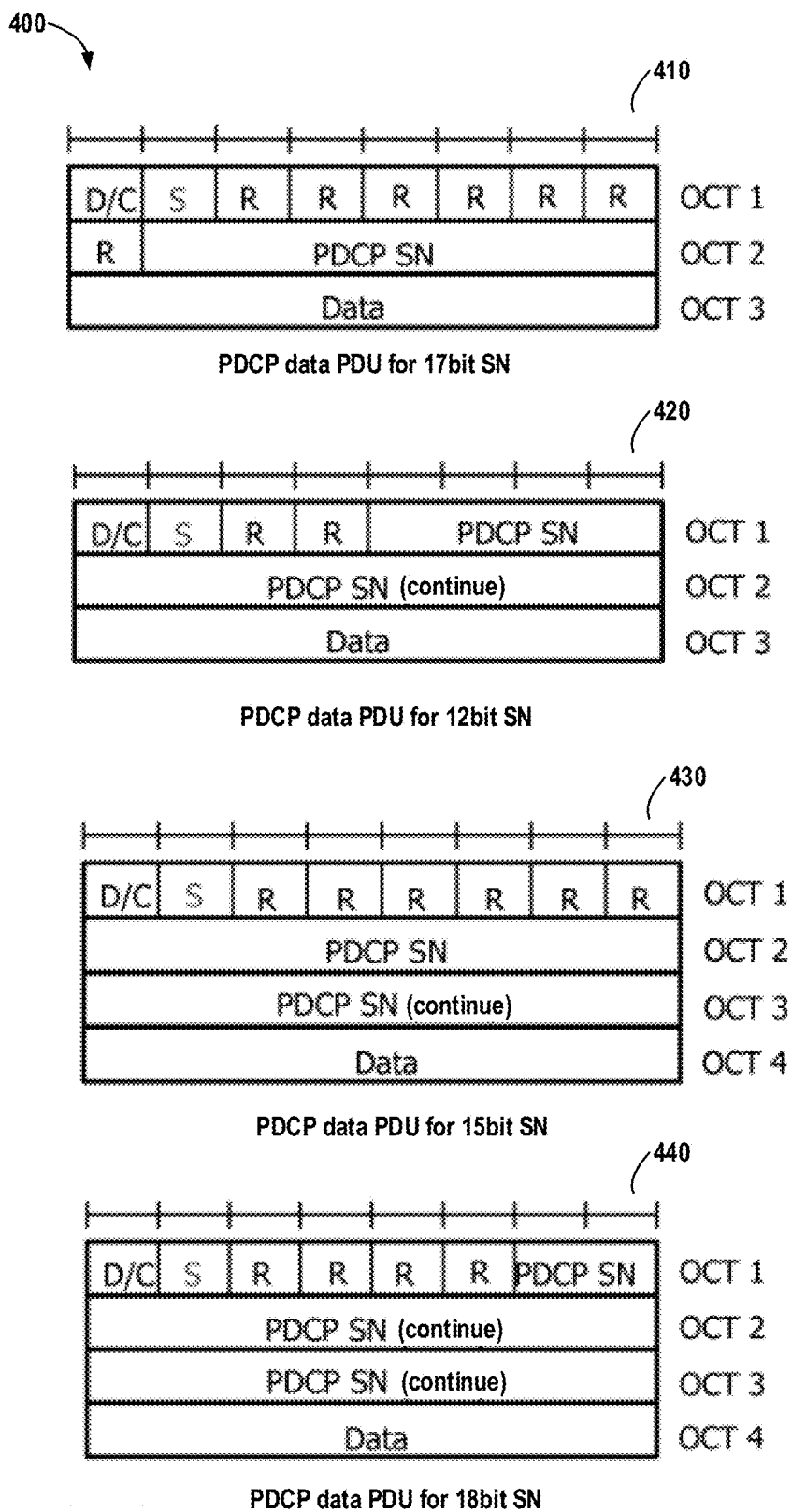
FIG. 4 illustrates some example formats of LTE downlink (DL) data PDUs in accordance with embodiments of the present disclosure.

In some embodiments, the second network device 130 may indicate the determined SN in a header of a data PDU corresponding to each of the fourth set of SDUs. For example, the second network device 130 may indicate the determined SN by one bit in the header. FIG. 4 illustrates some example formats 400 of LTE DL PDCP data PDUs in accordance with embodiments of the present disclosure. The data PDUs 410-440 respectively show data PDUs for 7, 12, 15 and 18 bit SNs. D/C field indicates whether the current PDU is a data PDU or a control PDU. R field refers to a reserved field. SN field indicates the content of the determined SN. Table 1 shows the description of the S field in the data PDUs.

TABLE 1

S field

| Bit | Description |
|---|---|
| 0 | PDU other than the first PDU with a SN assigned by the target network device during simultaneous connectivity based handover |
| 1 | First PDU with SN assigned by the target network device during simultaneous connectivity based handover |

Figure 5:
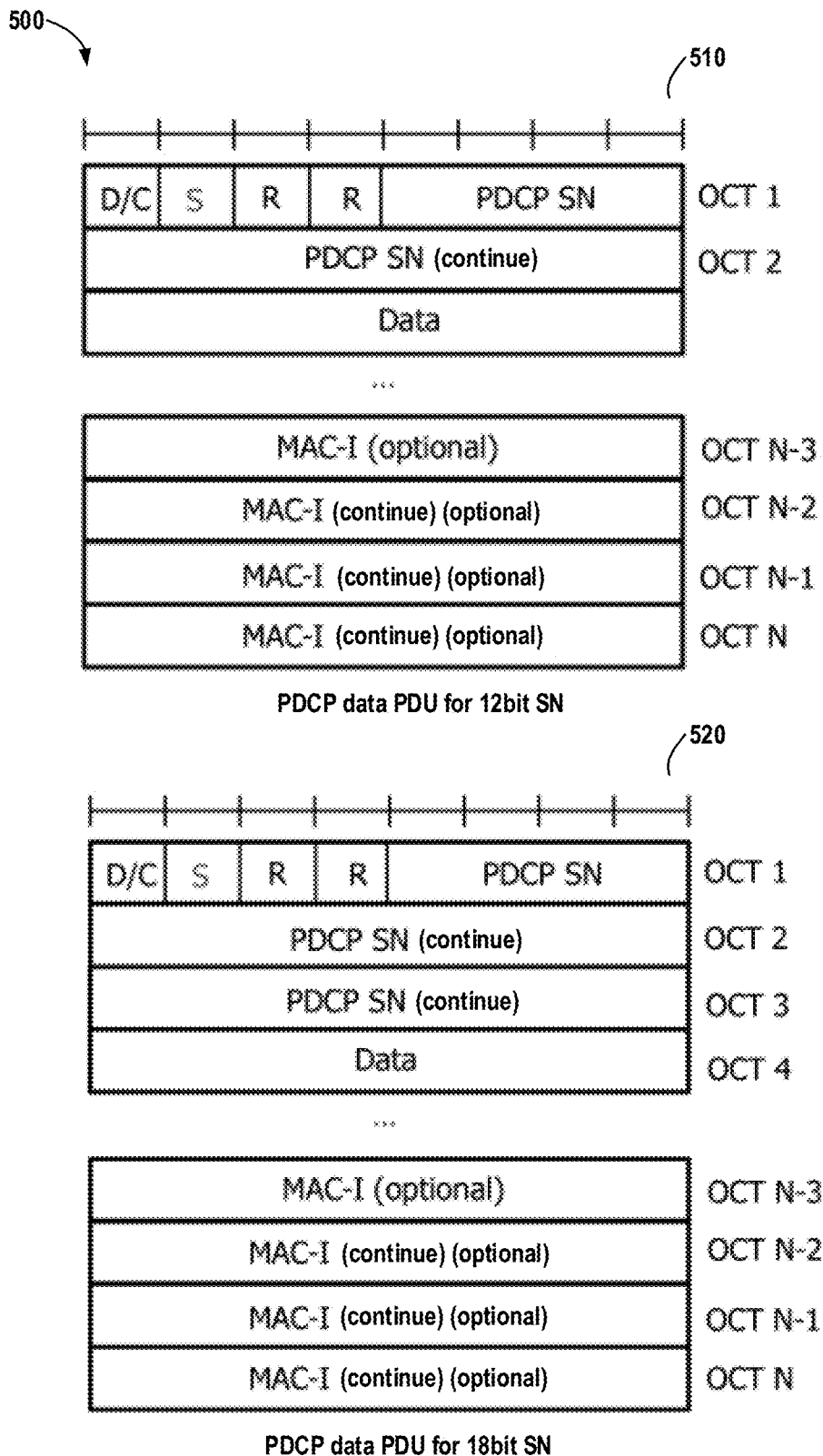
FIG. 5 illustrates some example formats of NR DL data PDUs in accordance with embodiments of the present disclosure.

FIG. 5 illustrates some example formats 500 of NR DL data PDUs in accordance with embodiments of the present disclosure. The data PDUs 510-520 respectively show data PDUs for 12 and 18 bit SNs. D/C field indicates whether the current PDU is a data PDU or a control PDU. R field refers to a reserved field. SN field indicates the content of the determined SN. The description of the S field in the data PDUs is shown in Table 1 above.

In some alternative embodiments, the second network device 130 may transmit the determined SN to the terminal device 120 by a radio resource control (RRC) signaling. In some embodiments for LTE, a PDU immediately after a RRC signaling for releasing the first connection may be considered as the first PDU.

Accordingly, the terminal device 120 may receive from the second network device 130, the fourth set of SDUs comprising SDUs which have not been transmitted to the terminal device 120. In some embodiments, the terminal device 120 may determine 220' whether the first PDU that is assigned with a determined SN by the second network device 130 is received. In some embodiments, the terminal device 120 may determine that the first PDU is received in response to receiving a PDU having a SN equal to a determined SN. In some embodiments, the terminal device 120 may obtain the determined SN from at least one of: a control PDU; a header of a data PDU; or a radio resource control (RRC) signaling informing the determined SN. In some alternative embodiments, the terminal device 120 may determine that the first PDU is received in response to receiving a PDU immediately after a RRC signaling for releasing the first connection.

With reference to FIG. 2, if determining that the first PDU is received, the terminal device 120 may deliver 221' all the buffered SDUs for further processing, and reset 222' a reordering window for the first PDU. Thereby, it becomes possible that the terminal device 120 no longer wait for packets that may never be received, and thus reordering latency due to missing of PDU on the source network device 110 before being released may be further reduced.

In some embodiments for LTE, upon receiving first PDU with a SN (SN*,COUNT*) assigned by the target network device 130, the terminal device 120 may deliver all stored SDUs, if any, to upper layers in ascending order of associated COUNT values. Here, COUNT* is determined by SN* and HFN associated with the SN*. For example, assuming that Next_PDCP_RX_SN refers to the next expected PDCP SN by the receiver for a given PDCP entity, and Last_Submitted_PDCP_RX_SN refers to the SN of the last PDCP SDU delivered to the upper layers. In the meanwhile, Next_PDCP_RX_SN is set as SN*, and Last_Submitted_PDCP_RX_SN is set as SN*-1.

In some embodiments for NR, upon receiving first PDU with a SN (SN*, COUNT*) assigned by the target network device 130, the terminal device 120 may deliver all stored SDUs received from the RLC entity of source network device 110 and SDUs received from the RLC entity of target network device 130 with COUNT<COUNT*, if any, to upper layers in ascending order of associated COUNT values. For example, assuming that RX_DELIV refers to the first PDCP SDU being not delivered to the upper layers but still being waited for. In the meanwhile, RX_DELIV is set as the COUNT value of the first PDU.

Embodiments of the present disclosure mainly involve data transmission during an activation of simultaneous connectivity based handover, and communication before the activation of the handover is not limited here, as shown by a dash line in FIG. 2. Corresponding to the process described in FIG. 2, embodiments of the present disclosure provide methods of communication implemented at source and target network devices and at a terminal device. These methods will be described below with reference to FIGS. 6 to 11.

Figure 6:
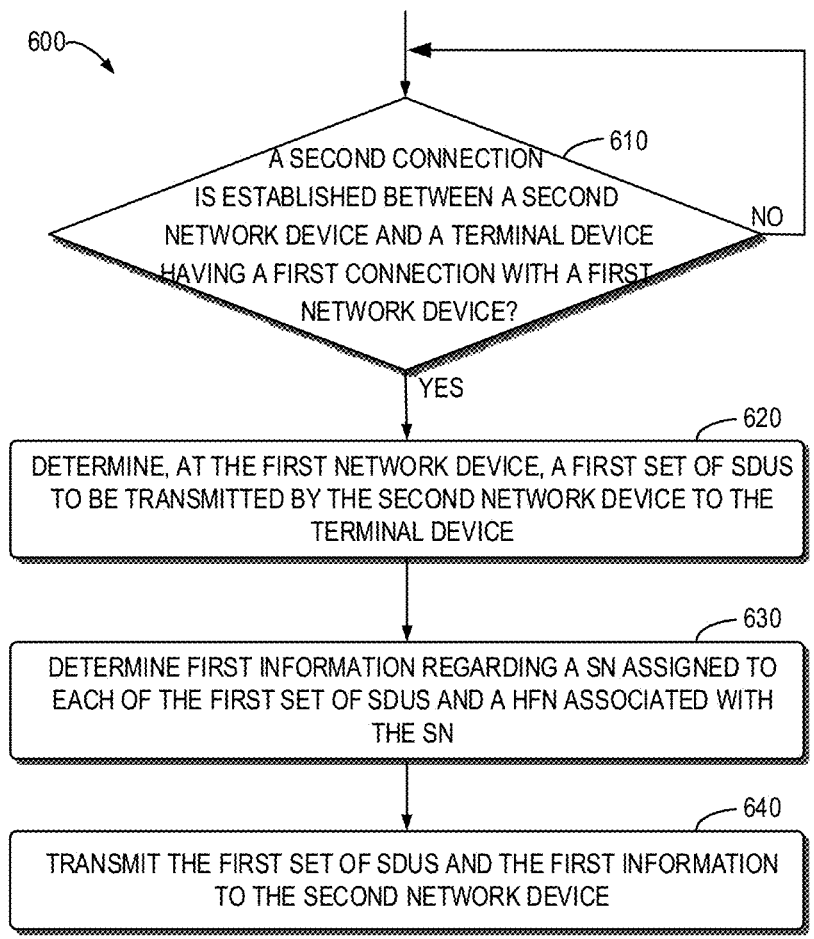
FIG. 6 illustrates an example method of communication implemented at a first network device as a source network device during an activation of the simultaneous connectivity in accordance with some embodiments of the present disclosure.

FIG. 6 illustrates an example method 600 of communication implemented at a first network device as a source network device during an activation of the simultaneous connectivity in accordance with some embodiments of the present disclosure. For example, the method 600 may be performed at the first network device 110 as shown in FIG. 1. For the purpose of discussion, in the following, the method 600 will be described with reference to FIG. 1. It is to be understood that the method 600 may include additional blocks not shown and/or may omit some blocks as shown, and the scope of the present disclosure is not limited in this regard.

At block 610, the first network device 110 may determine whether a second connection is established between the second network device 130 and the terminal device 120 having a first connection with the first network device 110. If determining at block 610 that the second connection is established, at block 620, the first network device 110 may determine a first set of SDUs to be transmitted by the second network device 130 to the terminal device 120.

At block 630, the first network device 110 may determine first information regarding a SN assigned to each of the first set of SDUs and a HFN associated with the SN. In some embodiments in which the SN for each of the first set of SDUs is consecutive, the first network device 110 may determine a first SN assigned to the first SDU in the first set, determine the number of subsequent SDUs in the first set, and determine a first HFN associated with the first SN.

At block 640, the first network device 110 may transmit the first set of SDUs and the first information to the second network device 130. In some embodiments in which the SN for each of the first set of SDUs is consecutive, the first network device 110 may transmit the first SN, the number of subsequent SDUs, and the first HFN. In some embodiments, the first network device 110 may determine a second HFN associated with a SN assigned to one of the subsequent SDUs; and in response to the first HFN being different from the second HFN, transmitting the first SN, the number of subsequent SDUs, the first HFN for the first SDU, and the second HFN for the one SDU.

In some embodiments, the first network device 110 may receive, from the second network device 130, an indication for releasing the first connection, and release the first connection based on the indication. In some alternative embodiments, the first network device 110 may initiate the release of the first connection.

Figure 7:
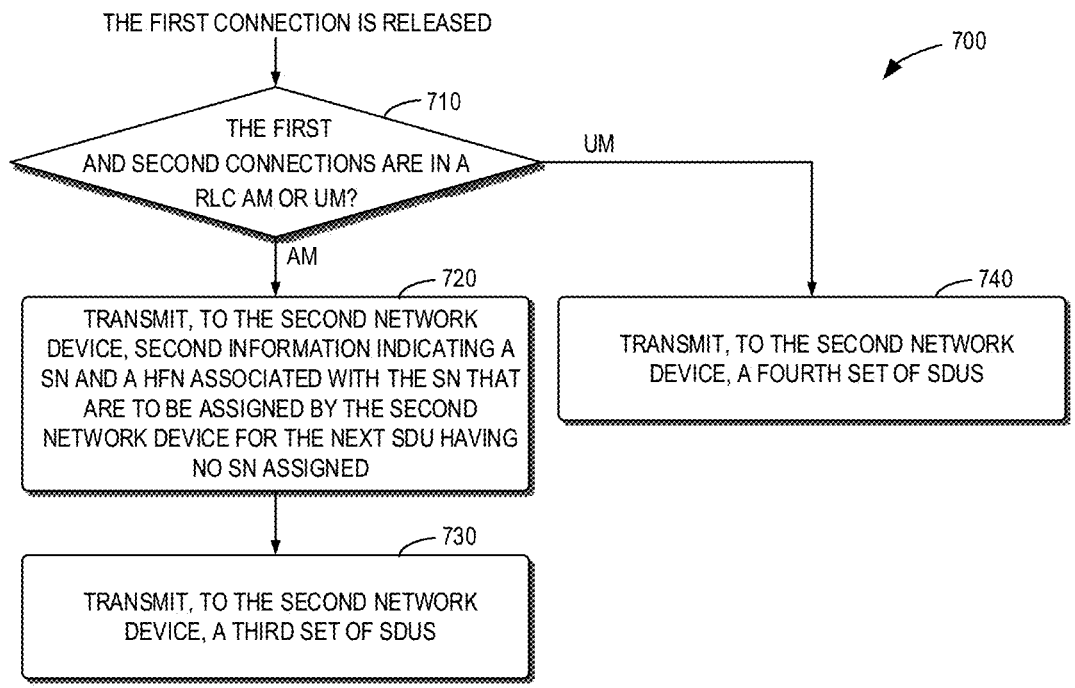
FIG. 7 illustrates an example method of communication implemented at the first network device during a release of the first network device in accordance with some embodiments of the present disclosure.

FIG. 7 illustrates an example method 700 of communication implemented at the first network device during a release of the first network device in accordance with some embodiments of the present disclosure. For example, the method 700 may be performed at the first network device 110 as shown in FIG. 1. For the purpose of discussion, in the following, the method 700 will be described with reference to FIG. 1. It is to be understood that the method 700 may include additional blocks not shown and/or may omit some blocks as shown, and the scope of the present disclosure is not limited in this regard.

As shown in FIG. 7, at block 710, the first network device 110 may determine, in response to the first connection being released, whether the first and second connections are in RLC AM or UM. If determining at block 710 that the first and second connections are in RLC AM, at block 720, the first network device 110 may transmit, to the second network device 130, second information indicating a SN and a HFN associated with the SN that are to be assigned by the second network device 130 for the next SDU having no SN assigned.

At block 730, the first network device 110 may transmit, to the second network device 130, a third set of SDUs comprising at least one of: SDUs with respective SNs that have been transmitted by the first network device 110 but have not been acknowledged by the terminal device 120; and ii) SDUs without respective SNs that have been received by the first network device 110.

If determining at block 710 that the first and second connections are in RLC UM, at block 740, the first network device 110 may transmit, to the second network device 130, a fourth set of SDUs comprising at least one of: i) SDUs with respective SNs that have not been transmitted by the first network device 110; and ii) SDUs without respective SNs that have been received by the first network device 110.

In some embodiments, the first network device 110 may transmit, to the second network device 130, a second information indicating a SN and a HFN associated with the SN that are to be assigned by the second network device 130 for the next SDU having no SN assigned.

Figure 8:
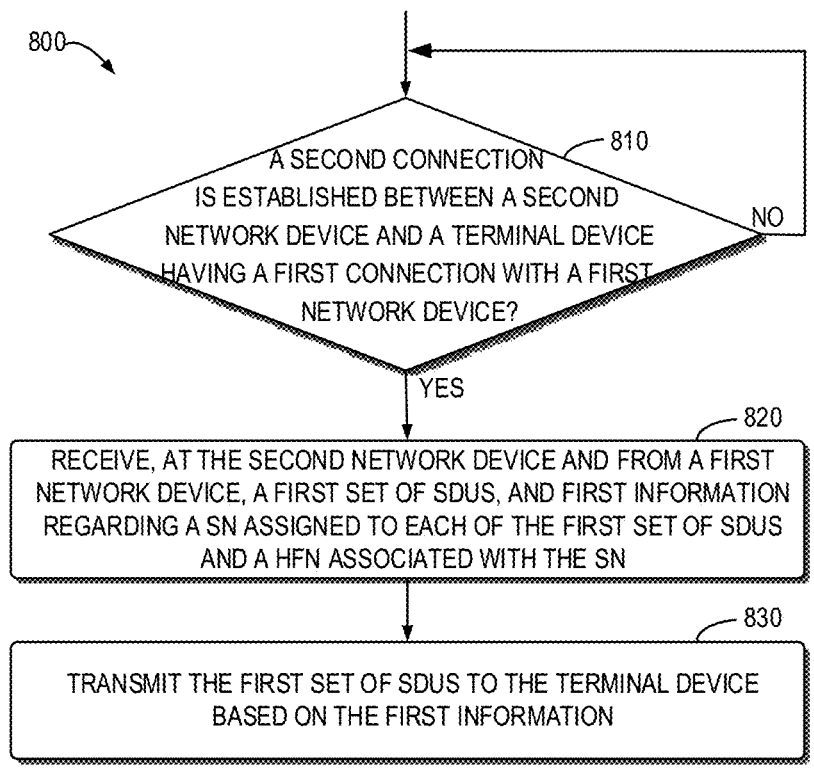
FIG. 8 illustrates an example method of communication implemented at a second network device as a target network device during an activation of the simultaneous connectivity in accordance with some embodiments of the present disclosure.

FIG. 8 illustrates an example method 800 of communication implemented at a second network device as a target network device during an activation of the simultaneous connectivity in accordance with some embodiments of the present disclosure. For example, the method 800 may be performed at the second network device 130 as shown in FIG. 1. For the purpose of discussion, in the following, the method 800 will be described with reference to FIG. 1. It is to be understood that the method 800 may include additional blocks not shown and/or may omit some blocks as shown, and the scope of the present disclosure is not limited in this regard.

At block 810, the second network device 130 may determine whether a second connection is established between the second network device 130 and the terminal device 120 having a first connection with the first network device 110. If determining at block 810 that the second connection is established, at block 820, the second network device 130 may receive, from a first network device 110, a first set of SDUs, and first information regarding a SN assigned to each of the first set of SDUs and a HFN associated with the SN.

In some embodiments in which the SN for each of the first set of SDUs is consecutive, the second network device 130 may determine, from the first information, a first SN assigned to the first SDU in the first set, the number of subsequent SDUs in the first set, and a first HFN associated with a first SN assigned to the first SDU in the first set, determine the SN for each of the set of SDUs based on the first SN and the number of subsequent SDUs, and determine the HFN for each of the set of SDUs based on the first HFN. In some embodiments, the second network device 130 may further receive a second HFN for one of subsequent SDUs, the second HFN being transmitted as the HFN for the one SDU in response to the first HFN being different from the second HFN for the one SDU.

At block 830, the second network device 130 may transmit the first set of SDUs to the terminal device 120 based on the first information. In some embodiments, the second network device 130 may transmit, to the first network device 110, an indication for releasing the first connection. In some alternative or additional embodiments, the second network device 130 may transmit, to the terminal device 120, the indication for releasing the first connection.

Figure 9:
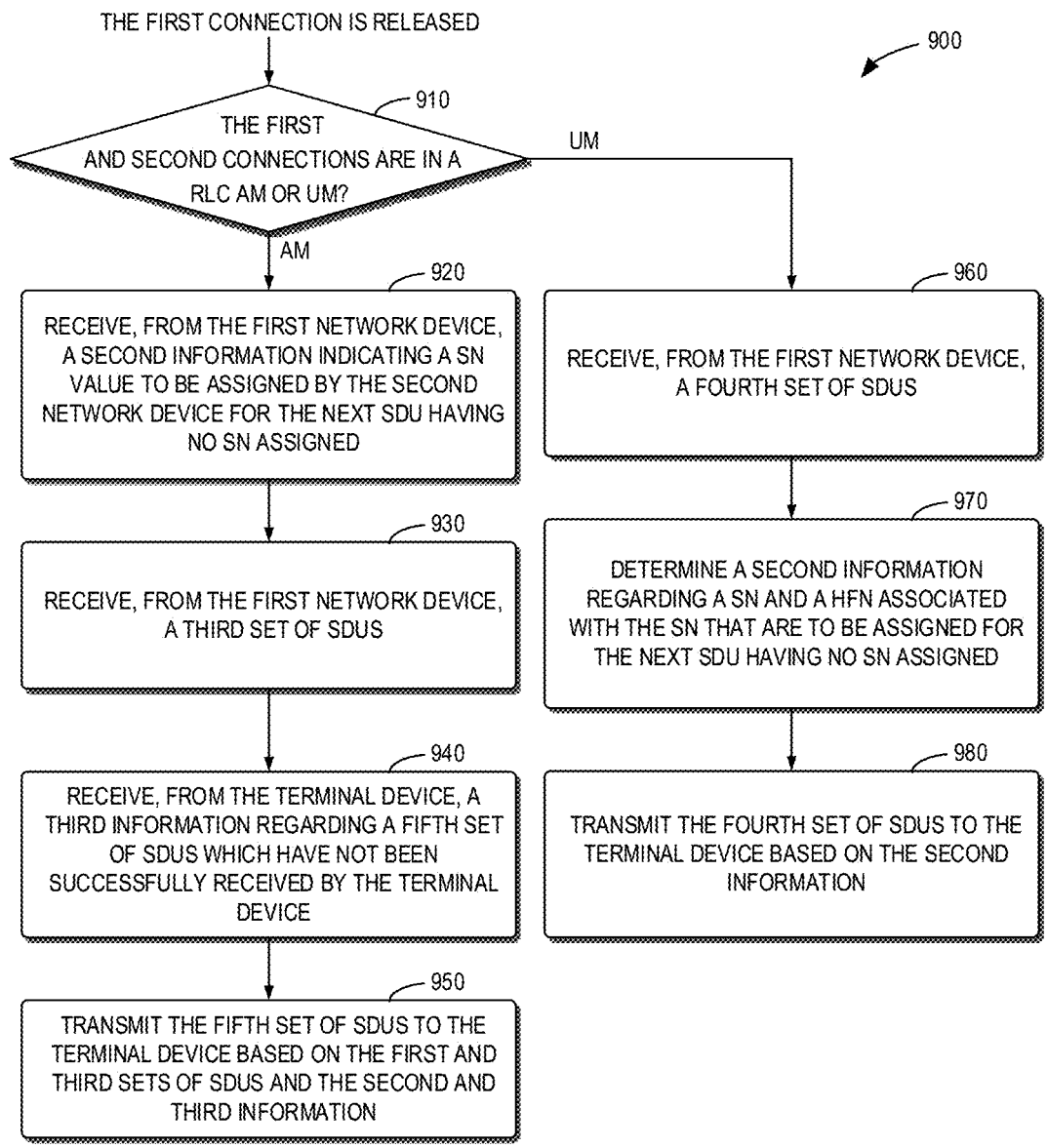
FIG. 9 illustrates an example method of communication implemented at the second network device during a release of the first network device in accordance with some embodiments of the present disclosure.

FIG. 9 illustrates an example method 900 of communication implemented at the second network device during a release of the first network device in accordance with some embodiments of the present disclosure. For example, the method 900 may be performed at the second network device 130 as shown in FIG. 1. For the purpose of discussion, in the following, the method 900 will be described with reference to FIG. 1. It is to be understood that the method 900 may include additional blocks not shown and/or may omit some blocks as shown, and the scope of the present disclosure is not limited in this regard.

As shown in FIG. 9, at block 910, the second network device 130 may determine, in response to the first connection being released, whether the first and second connections are in RLC AM or UM. If determining at block 910 that the first and second connections are in RLC AM, at block 920, the second network device 130 may receive, from the first network device 110, second information indicating a SN and a HFN associated with the SN that are to be assigned by the second network device 130 for the next SDU having no SN assigned.

At block 930, the second network device 130 may receive, from the first network device 110, a third set of SDUs comprising at least one of: i) SDUs with respective SNs that have been transmitted by the first network device 110 but have not been acknowledged by the terminal device 120; and ii) SDUs without respective SNs that have been received by the first network device 110.

At block 940, the second network device 130 may receive, from the terminal device 120, a third information regarding a fifth set of SDUs which have not been successfully received by the terminal device 120. In some embodiments, the second network device 130 may receive the third information in a higher priority than uplink data transmission. At block 950, the second network device 130 may transmit the fifth set of SDUs to the terminal device 120 based on the first and third sets of SDUs and the second and third information.

If determining at block 910 that the first and second connections are in RLC UM, at block 960, the second network device 130 may receive, from the first network device 110, a fourth set of SDUs comprising at least one of: i) SDUs with respective SNs that have not been transmitted by the first network device 110; and ii) SDUs without respective SNs that have been received by the first network device 110.

At block 970, the second network device 130 may determine a second information regarding a SN and a HFN associated with the SN that are to be assigned for the next SDU having no SN assigned. In some embodiments, the second network device 130 may determine the second information by at least one of: initializing the SN and HFN to be predetermined values; receiving the second information from the first network device 110; determining the SN and HFN as being larger than a SN and HFN for the last SDU transmitted by the second network device 130; determining the SN and HFN as being different from SNs and HFNs for the first set of SDUs; or determining the SN and HFN as being different from SNs and HFNs that have been assigned by the first network device 110.

At block 980, the second network device 130 may transmit the fourth set of SDUs to the terminal device 120 based on the second information. In some embodiments, the second network device 130 may determine a SN which is assigned to the first one of the fourth set of SDUs; and transmit the determined SN to the terminal device. In some embodiments, the second network device 130 may transmit the determined SN by at least one of: transmitting the determined SN in a control PDU; indicating the determined SN in a header of a data PDU corresponding to each of the fourth set of SDUs; or transmitting the determined SN to the terminal device by a RRC signaling.

Figure 10:
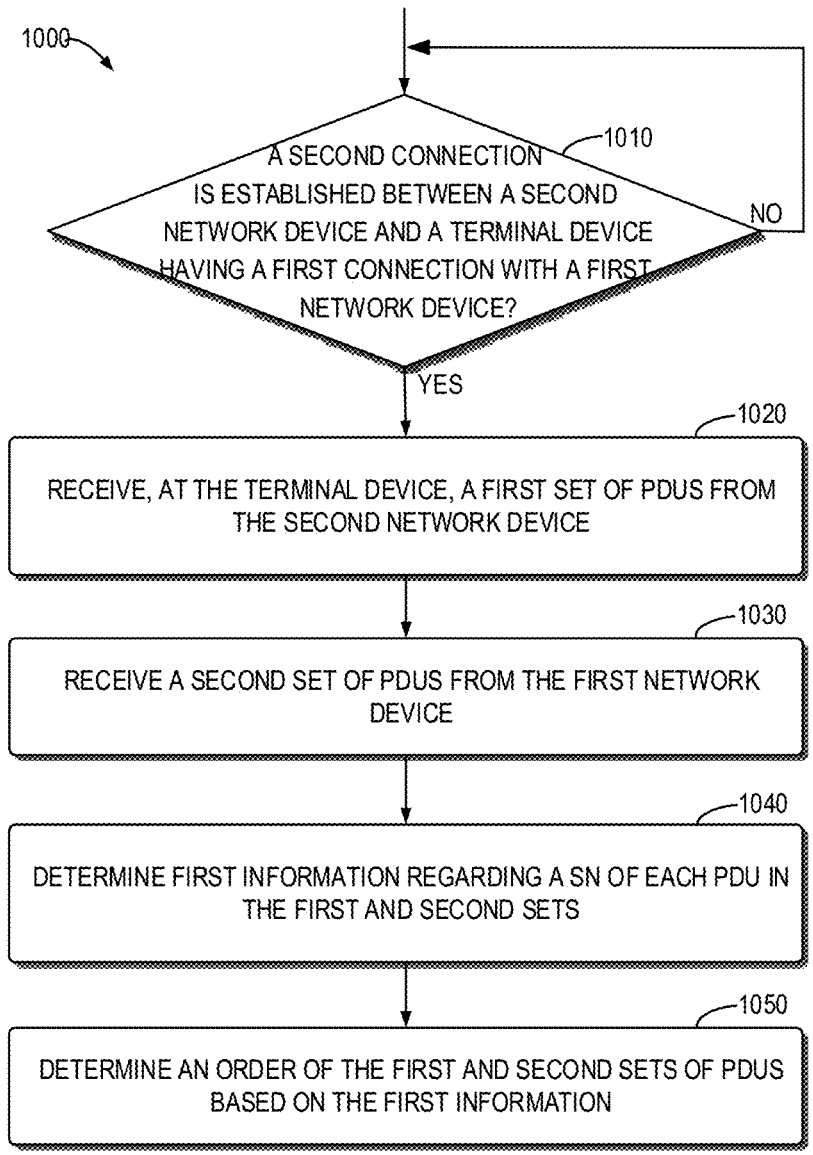
FIG. 10 illustrates an example method of communication implemented at a terminal device during an activation of the simultaneous connectivity in accordance with some embodiments of the present disclosure.

FIG. 10 illustrates an example method 1000 of communication implemented at a terminal device during an activation of the simultaneous connectivity in accordance with some embodiments of the present disclosure. For example, the method 1000 may be performed at the terminal device 120 as shown in FIG. 1. For the purpose of discussion, in the following, the method 1000 will be described with reference to FIG. 1. It is to be understood that the method 1000 may include additional blocks not shown and/or may omit some blocks as shown, and the scope of the present disclosure is not limited in this regard.

As shown in FIG. 10, at block 1010, the terminal device 120 may determine whether a second connection is established between a second network device 130 and a terminal device 120 having a first connection with a first network device 110. If determining at block 1010 that the second connection is established, at block 1020, the terminal device 120 may receive a first set of PDUs from the second network device 130. At block 1030, the terminal device 120 may receive a second set of PDUs from the first network device 110. At block 1040, the terminal device 120 may determine first information regarding a SN of each PDU in the first and second sets and a HFN associated with the SN. At block 1050, the terminal device 120 may determine an order of the first and second sets of PDUs based on the first information.

In some embodiments, the terminal device 120 may receive, from the second network device 130, an indication for releasing the first connection and release the first connection by the terminal device based the indication. In some alternative or additional embodiments, the terminal device 120 may initiate the release of the first connection.

Figure 11:
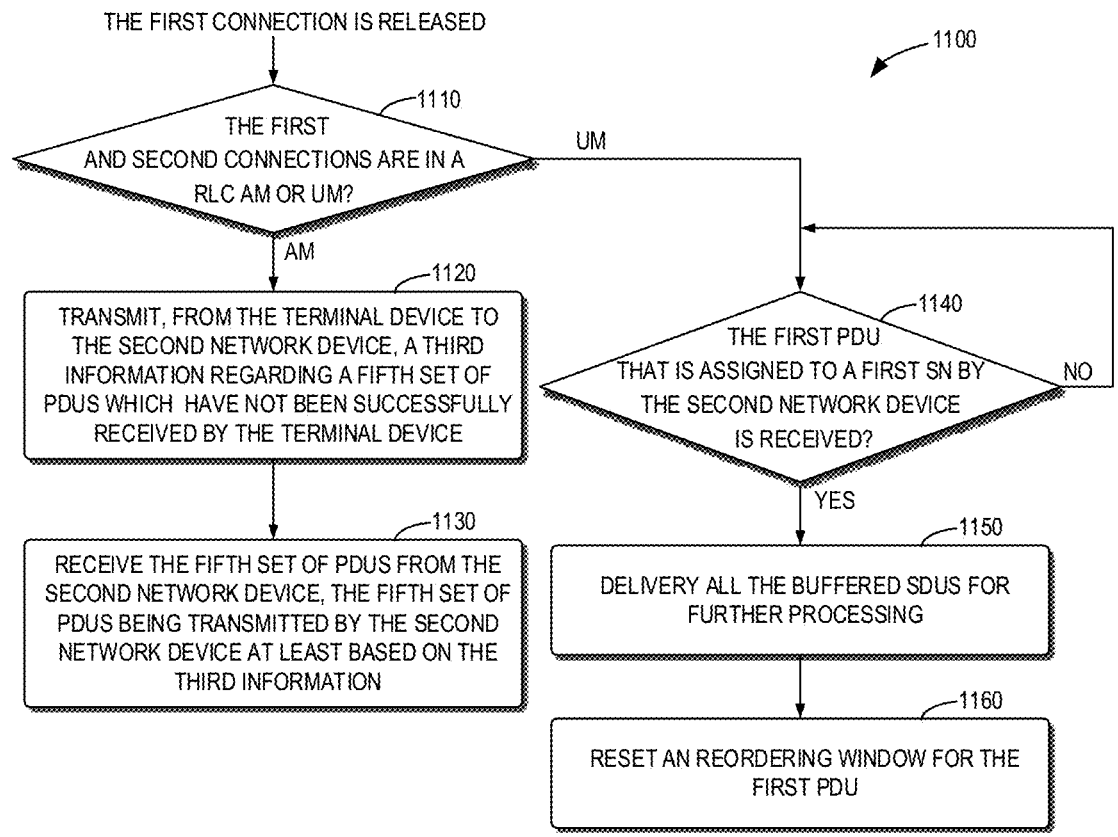
FIG. 11 illustrates an example method of communication implemented at the terminal device during a release of the first network device in accordance with some embodiments of the present disclosure.

FIG. 11 illustrates an example method 1100 of communication implemented at the terminal device during a release of the first network device in accordance with some embodiments of the present disclosure. For example, the method 1100 may be performed at the terminal device 120 as shown in FIG. 1. For the purpose of discussion, in the following, the method 1100 will be described with reference to FIG. 1. It is to be understood that the method 1100 may include additional blocks not shown and/or may omit some blocks as shown, and the scope of the present disclosure is not limited in this regard.

As shown in FIG. 11, at block 1110, the terminal device 120 may determine, in response to the first connection being released, whether the first and second connections are in RLC AM or UM. If determining at block 1110 that the first and second connections are in RLC AM, at block 1120, the terminal device 120 may transmit, to the second network device 130, third information regarding a fifth set of PDUs which have not been successfully received by the terminal device 120. In some embodiments, the terminal device 120 may transmit the third information in a higher priority than UL data transmission.

At block 1130, the terminal device 120 may receive the fifth set of PDUs from the second network device 130, the fifth set of PDUs being transmitted by the second network device 130 at least based on the third information.

If determining at block 1110 that the first and second connections are in RLC UM, at block 1140, the terminal device 120 may determine whether the first PDU that is assigned with a determined SN by the second network device 130 is received. In some embodiments, the terminal device 120 may receive the determined SN by at least one of: receiving the determined SN in a control PDU; receiving an indication for the determined SN in a header of a data PDU; or receiving a RRC signaling informing the determined SN. In some embodiments, the terminal device 120 may determine, in response to receiving a PDU having a SN equal to the determined SN, that the first PDU is received. In some alternative embodiments, the terminal device 120 may determine, in response to receiving a PDU immediately after a RRC signaling for releasing the first connection, the PDU as the first PDU.

If determining at block 1140 that the first PDU is received, at block 1150, the terminal device 120 may deliver all the buffered SDUs for further processing. At block 1160, the terminal device 120 may reset a reordering window for the first PDU.

The implementations of the method described in FIGS. 6-11 substantially correspond to the processes described in connection with FIG. 2, and thus other details are not repeated here. With the method 600-1100 according to embodiments of the present disclosure, correct data transmission during a simultaneous connectivity based handover can be facilitated and data transmission efficiency can be improved.

Figure 12:
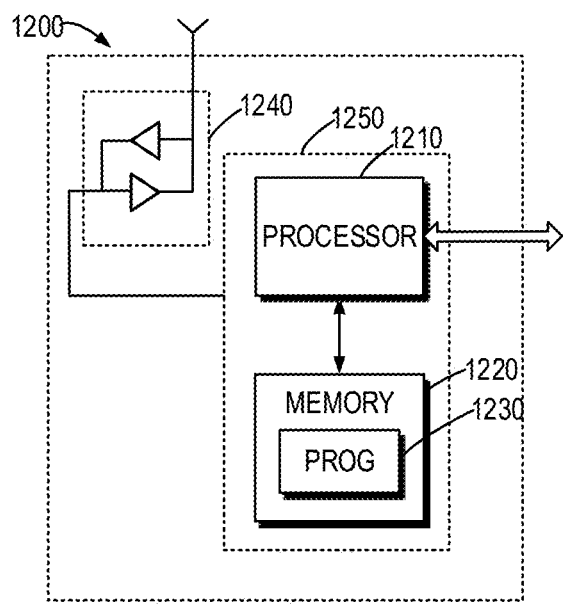
FIG. 12 is a simplified block diagram of a device that is suitable for implementing embodiments of the present disclosure.

FIG. 12 is a simplified block diagram of a device 1200 that is suitable for implementing embodiments of the present disclosure. The device 1200 can be considered as a further example implementation of the first network device 110, the terminal device 120, or the second network device 130 as shown in FIG. 1. Accordingly, the device 1200 can be implemented at or as at least a part of the first network device 110, the terminal device 120, or the second network device 130.

As shown, the device 1200 includes a processor 1210, a memory 1220 coupled to the processor 1210, a suitable transmitter (TX) and receiver (RX) 1240 coupled to the processor 1210, and a communication interface coupled to the TX/RX 1240. The memory 1210 stores at least a part of a program 1230. The TX/RX 1240 is for bidirectional communications. The TX/RX 1240 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 1230 is assumed to include program instructions that, when executed by the associated processor 1210, enable the device 1200 to operate in accordance with the embodiments of the present disclosure, as discussed herein with reference to FIGS. 1 to 11. The embodiments herein may be implemented by computer software executable by the processor 1210 of the device 1200, or by hardware, or by a combination of software and hardware. The processor 1210 may be configured to implement various embodiments of the present disclosure. Furthermore, a combination of the processor 1210 and memory 1220 may form processing means 1250 adapted to implement various embodiments of the present disclosure.

The memory 1220 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 1220 is shown in the device 1200, there may be several physically distinct memory modules in the device 1200. The processor 1210 may be of any type suitable to the local technical network, and may include one or more of general purpose computers, special purpose computers, microprocessors, digital signal processors (DSPs) and processors based on multicore processor architecture, as non-limiting examples. The device 1200 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIGS. 6 to 11. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method for a first network, the method comprising:
    transmitting, to a second network device, SN (sequence number) status information including information for a SN and a hyper frame number (HFN) that are to be assigned by the second network device for a next SDU (Service Data Unit) having no SN assigned, during a handover for a radio link control (RLC) unacknowledged mode (UM),
    transmitting, to the second network device, SDUs comprising at least one of: i) SDUs with respective SNs corresponding to the data that have not been acknowledged by a terminal device; and ii) SDUs without respective SNs that have been received by the first network device,
    wherein, after the terminal device has performed successful random access to the second network device, a handover success message is transmitted from the second network device to the first network device to inform that the terminal device has successfully accessed a cell of the second network device.

2. A method for a second network device, the method, comprising:
    receiving, from a first network device, SN (sequence number) status information including information for a SN and a hyper frame number (HFN) that are to be assigned by a second network device for a next SDU (Service Data Unit) having no SN assigned, during a handover for a radio link control (RLC) unacknowledged mode (UM),
    receiving, from the first network device, SDUs comprising at least one of: i) SDUs with respective SNs corresponding to the data that have not been acknowledged by the terminal device; and ii) SDUs without respective SNs that have been received by the first network device,
    wherein, after the terminal device has performed successful random access to the second network device, a handover success message is transmitted from the second network device to the first network device to inform that the terminal device has successfully accessed a cell of the second network device.

3. A first network device comprising:
    a transmitter configured to transmit to a second network device:
        SN (sequence number) status information including information for a SN and a hyper frame number (HFN) that are to be assigned by the second network device for a next SDU (Service Data Unit) having no SN assigned, during a handover for a radio link control (RLC) unacknowledged mode (UM); and
        SDUs comprising at least one of: i) SDUs with respective SNs corresponding to the data that have not been acknowledged by a terminal device; and ii) SDUs without respective SNs that have been received by the first network device,
    wherein, after the terminal device has performed successful random access to the second network device, a handover success message is transmitted from the second network device to the first network device to inform that the terminal device has successfully accessed a cell of the second network device.

4. A second network device comprising:
    a receiver configured to receive, from a first network device:
    SN (sequence number) status information including information for a SN and a hyper frame number (HFN) that are to be assigned by the second network device for a next SDU (Service Data Unit) having no SN assigned, during a handover for a radio link control (RLC) unacknowledged mode (UM); and
    SDUs comprising at least one of: i) SDUs with respective SNs corresponding to the data that have not been acknowledged by the terminal device; and ii) SDUs without respective SNs that have been received by the first network device,
    wherein, after the terminal device has performed successful random access to the second network device, a handover success message is transmitted from the second network device to the first network device to inform that the terminal device has successfully accessed a cell of the second network device.

* * * * *